US009110656B2

(12) United States Patent
Tran et al.

(10) Patent No.: US 9,110,656 B2
(45) Date of Patent: *Aug. 18, 2015

(54) SYSTEMS AND METHODS FOR HANDLING INSTRUCTIONS OF IN-ORDER AND OUT-OF-ORDER EXECUTION QUEUES

(75) Inventors: Thang M. Tran, Austin, TX (US); Trinh Huy H. Nguyen, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 838 days.

This patent is subject to a terminal disclaimer.

(21) Appl. No.: 13/210,566

(22) Filed: Aug. 16, 2011

(65) Prior Publication Data
US 2013/0046956 A1    Feb. 21, 2013

(51) Int. Cl.
G06F 9/30 (2006.01)
G06F 9/38 (2006.01)

(52) U.S. Cl.
CPC .......... G06F 9/30087 (2013.01); G06F 9/3814 (2013.01); G06F 9/3824 (2013.01); G06F 9/3838 (2013.01); G06F 9/3851 (2013.01); G06F 9/3891 (2013.01)

(58) Field of Classification Search
CPC .. G06F 9/30087; G06F 9/3838; G06F 9/3824
USPC .................................................. 712/216, 217
See application file for complete search history.

(56) References Cited

U.S. PATENT DOCUMENTS

| | | | |
|---|---|---|---|
| 6,112,019 A * | 8/2000 | Chamdani et al. | 712/214 |
| 6,308,260 B1 * | 10/2001 | Le et al. | 712/215 |
| 6,385,715 B1 * | 5/2002 | Merchant et al. | 712/219 |
| 6,553,484 B1 * | 4/2003 | Sawamura | 712/217 |
| 6,931,641 B1 | 8/2005 | Davis et al. | |
| 2004/0003309 A1 * | 1/2004 | Cai et al. | 713/320 |
| 2004/0215932 A1 | 10/2004 | Burky et al. | |
| 2004/0216101 A1 | 10/2004 | Burky et al. | |
| 2007/0198812 A1 * | 8/2007 | Abernathy et al. | 712/214 |
| 2009/0063735 A1 * | 3/2009 | Ng et al. | 710/54 |
| 2010/0161945 A1 * | 6/2010 | Burky et al. | 712/215 |
| 2012/0221835 A1 | 8/2012 | Tran | |

OTHER PUBLICATIONS

Hennessy et al., "Computer Architecture a Quantative Approach", 1996, 2nd Edition, pp. 187-194 and 251-261.*
Smotherman, M., "Eager Execution/Dual Path/Multiple Path", http://www.cs.clemson.edu/~mark/eager.html, Jul. 2010, pp. 1-9.
U.S. Appl. No. 13/212,420, Office Action—Allowance, mailed May 28, 2014.

* cited by examiner

*Primary Examiner* — Boris Gorney
*Assistant Examiner* — Yuqing Xiao

(57) ABSTRACT

A processor configured to provide instructions of a first instruction type to a first execution unit, and a second execution queue configured to provide instructions of a second instruction type to a second execution unit. A first instruction of the second instruction type is received. The first instruction is decoded by the decode/issue unit to determine operands of the first instruction. The operands of the first instruction are determined to include a dependency on a second instruction of the first instruction type stored in a first entry of the first execution queue. The first instruction is stored in a first entry of the second execution queue. A synchronization indicator corresponding to the first instruction in a second entry of the first execution queue is set immediately adjacent the first entry of the first execution queue, which indicates that the first instruction is stored in another execution queue.

17 Claims, 8 Drawing Sheets

SYSTEMS AND METHODS FOR HANDLING INSTRUCTIONS OF IN-ORDER AND OUT-OF-ORDER EXECUTION QUEUES

BACKGROUND

1. Field

This disclosure relates generally to computer processor architecture, and more specifically, to configuring a computer processor for handling instructions with multiple dependencies.

2. Related Art

One goal of ongoing processor development is to increase the number of instructions per cycle (IPC). A computer processor's IPC is typically limited by stalling of instructions in queues due to the inability to access memory when instructions are executed in-order. Issuing instructions out-of-order can help to a certain degree, but eventually stalled instructions will block other independent instructions from execution as out-of-order dependent instructions fill up the queue.

Further, there is ever-increasing pressure to reduce power consumption in computer processor devices to conserve available power and extend the operating life of portable devices between re-charging cycles.

BRIEF DESCRIPTION OF THE DRAWINGS

Embodiments of the present disclosure are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
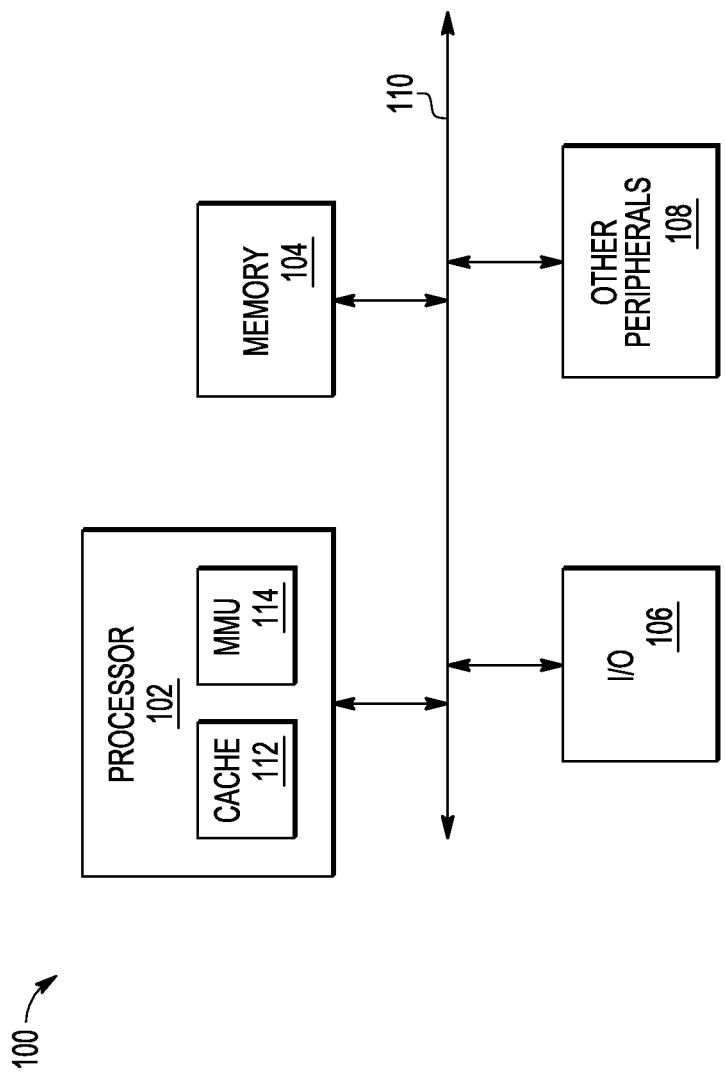
FIG. 1 is a diagram of an embodiment of a computer processing system in accordance with the present disclosure.

FIG. 1 shows a computer processing system 100 in which instruction decode and issue for latency tolerance execution can be implemented according to some embodiments of the disclosure. System 100 can be a superscalar microprocessor architecture in which instructions are issued in order to execution queues and instructions in each execution queue are executed in order but the instructions from different execution queues can execute out-of-order for latency tolerant execution. Complex instructions, such as load, store, integer multiply (IMUL), integer division (IDIV), floating point, and single instruction multiple data (SIMD) instructions, can have their own execution queues including an independent and a dependent complex instruction execution queue for complex instructions. As used herein, the term "complex instruction" refers to an instruction that takes more than one processor cycle to execute. When a complex instruction is dependent on the result of another instruction, a synchronization indicator, such as a specified instruction, can be inserted in the execution queue that depends on the result from the other execution queue. "Executing" the synchronization indicator results in a signal being sent to the other execution queue to enable the execution of dependent instruction. The result data can be read from a register file instead of forwarding result data between execution units and load store unit/data cache unit.

The dependent complex integer execution queue can have higher execution priority than the independent complex integer execution queue. If there is a valid instruction in the dependent complex integer execution queue, then the complex instruction can be sent to both the dependent and independent complex integer execution queues. The complex instruction in the independent complex integer execution queue can be removed once selected for execution while the complex instruction in the dependent complex integer execution queue can remain until execution is completed. At this time, data can be forwarded to the dependent instruction in the dependent complex integer execution queue.

In the illustrated embodiment, components in computer processing system 100 include processor 102, memory 104, input/output (I/O) handlers/interfaces 106, and other peripheral devices or modules 108 which are bi-directionally coupled to bus 110 to allow communication between components. Processor 102 includes Level 1 cache memory units 112 and memory management unit (MMU) 114.

Bus 110 may communicate external to computer processing system 100. Alternate embodiments of the present disclosure may use more, less, or different components and functional blocks that those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

MMU 114 is capable of providing various cache memory and bus control signals high-speed as well as virtual address to physical address translation. The virtual address is an address that is generated by processor 102 and as viewed by code that is executed by processor 102. The physical address is used to access the various higher-level memory banks such as a level-one RAM memory. Once processor 102 requests data from memory, MMU 114 can send a task identifier associated to the data request (or more generally to the task that is being executed by processor 102) to memory 104 and also to data cache internal to processor 102.

In alternate embodiments, computer processing system 100 may include one, two, or any number of processors 102. If a plurality of processors 102 are used in computer processing system 100, any number of them may be the same, or may be different. Note that although computer processing system 100 may have a plurality of processors 102, a single processor 102 which by itself can execute a plurality of instruction sets.

Memory module 104 can include a multi-level cache architecture including one or more levels of instruction cache and data cache module that have slower access rates than Level 1 cache modules 112. Memory 104 can also include an external memory that is also referred to as a main memory and can optionally include additional devices such as buffers and the like.

Figure 2:
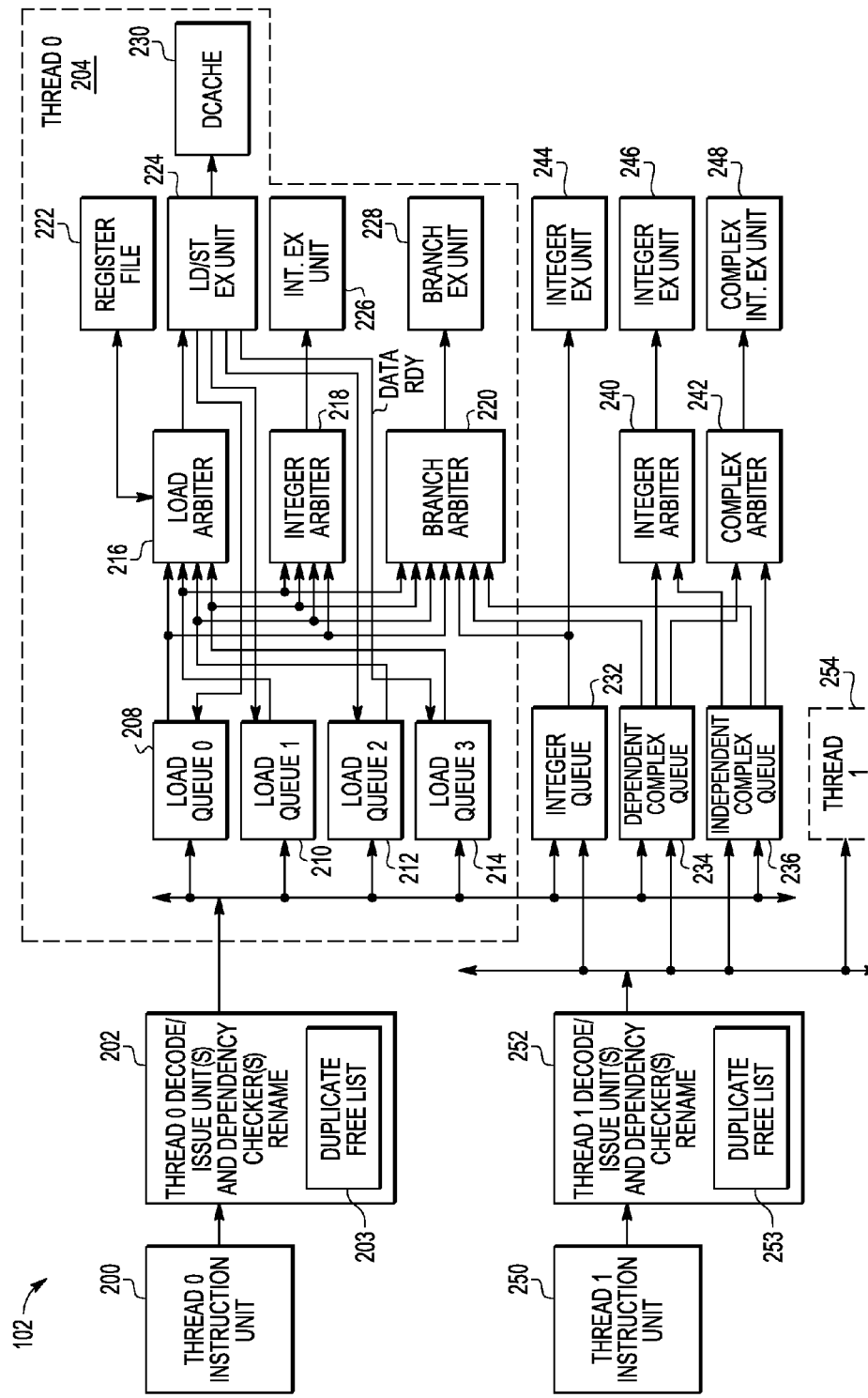
FIG. 2 is a diagram of an embodiment of instruction handling components that can be included in the computer processor of FIG. 1.

FIG. 2 is a diagram of an embodiment of instruction handling components that can be included in computer processor 102 of FIG. 1 with latency tolerance execution of one or more program threads (e.g., Thread0 and Thread1). Thread0 and Thread1 instruction units 200, 250 implement instruction queues configured to provide program instructions to respective decode/issue units 202, 252. Decode/issue units 202, 252 can include logic to multiplex valid instructions, decode instructions for instruction type, source, and destination operands, generate queue entries and tags for instructions, rename instruction operands to a latest register mapping, determine source and destination register dependencies between decoded instructions, check dependency with previous instructions in execution queues, and separate complex instructions into micro-instructions. Decode/issue units 202, 252 also include a duplicate instruction handler that generates respective duplicate free lists 203, 253 to indicate whether an instruction being issued to one of queues 208-214, 232, 234, 236 is a duplicate of an instruction being issued to another one or more of queues 208-214, 234, 236 during the same processor clock cycle. For example, duplicate free lists 203, 253 can include a number of bits, with each bit being used to represent whether a corresponding execution queue 208-214, 232, 234, 236 is free of instructions that are duplicated in another one of queues 208-214, 232, 234, 236.

Decode/issue units 202, 252 issue instructions to execution queues, and update register renaming for issued instructions. In the embodiment shown, a group of components 204 in processor 102 allocated to Thread0 includes load queues 208, 210, 212, 214, integer queue 232, and dependent and independent complex integer execution queues 234, 236. Another group of components 254 in processor 102 allocated to Thread1 includes a separate set of load queues 208-214, while integer queue 232 and dependent and independent complex integer execution queues 234, 236 can be shared with Thread0.

Note that although the architecture shows components for Thread0 and Thread1, additional program threads can be executed by processor 102. For example, although not labeled in FIG. 2, the components allocated for Thread0 may be used to execute Thread0 and a Thread2 while components allocated for Thread1 may be used to execute Thread1 and a Thread3. Further, processor 102 may use components for Thread0 and Thread1 to process a greater number of instructions per cycle while executing only one thread at a time. Components that can be duplicated to support multi-threading are shown within a dashed box 204 in FIG. 2 that includes load queues 208-214, load arbiter 216, integer arbiter 218, branch arbiter 220, register file 222, load/store unit 224, integer execution unit 226, branch execution unit 228, and data cache 230.

Processor 102 can further schedule execution of instructions using load arbiter 216, one or more integer arbiters 218, 240, branch arbiter 220, and complex arbiter 242. Load arbiter 216 and integer arbiter 218 can arbitrate execution of load/store and integer instructions in load queues 208-214. Branch arbiter 220 can arbitrate execution of branch instructions in load queues 208-214 as well as integer instructions in integer queue 232 and dependent and independent complex integer execution queues 234, 236. Integer arbiter 240 and complex arbiter 242 can each arbitrate integer instructions from dependent and independent complex integer execution queues 234, 236.

Microprocessors that require instructions to be executed in-order experience long delays when data required to execute the instruction is not found in cache memory, i.e., a cache miss occurs. Further, instructions that depend on one another may fill the execution queue and block the execution of independent instructions. Microprocessors that allow out-of-order execution include a replay queue for instructions that experience a data cache miss and constantly check for availability of source operands in order to execute instructions. In contrast, processor 102 includes multiple load queues 208-214 to hold the dependent instructions that experience a cache miss in the same queue until completion instead of replaying or re-issuing instructions while independent instructions are free to issue from other execution queues. Additionally, when an instruction issues, since the instructions in queues 208-214 can be in-order, data for source operands will be available from result forwarding or from register file 222. In many cases, it is possible to statistically determine when data for the source operands of an instruction will be available and schedule accordingly. However, in some cases, such as Level-1 data cache misses, the data may not be available as expected. In cases where instructions are dependent on two load instructions, the dependent instructions can be sent to two different queues 208-214. The dependent instruction in one of queues 208-214 will then be invalidated when the copy of the instruction reaches the head of another of queues 208-214.

In single thread mode, processor 102 can concurrently send two instructions to decode/issue unit 202 and one instruction to decode/issue unit 252 resulting in execution of three instructions per cycle. In multi-thread mode, two threads can concurrently send two instructions each to decode/issue units 202, 252 resulting in execution of two instructions per cycle per thread. Decode/issue units 202, 252 can also handle issuing serialized instructions such as instruction exceptions (e.g., Translation Look-aside Buffer miss, breakpoint, and illegal instruction), software interrupts (SWI), and instructions that modify processor configuration and states.

Load arbiter 216 sends instructions to load/store unit 224. Integer arbiter 218 sends instructions to integer execution unit 226. Branch arbiter 220 sends instructions to branch execution unit 228. Integer queue 232 sends instructions to integer execution unit 244. Integer arbiter 240 sends instructions to integer execution unit 246, and complex arbiter 242 sends instructions to complex integer execution unit 248. Note that integer arbiters 218 and 240 can be combined into one arbiter that receives instructions from load queues 208-214 and dependent and independent complex integer execution queues 234, 236, and send instructions to integer execution unit 226.

Load instructions from load queues 208-214 dispatch to load/store unit 224 and will remain in a respective queue until data is returned in the next clock cycle, effectively blocking all dependent instructions until valid data is returned in the next clock cycle. Load/store unit 224 can send data ready signals to load queues 208-214 when a cache hit is detected from data cache 230. The bottom entries of load queues 208-214 can send an entry or tag that includes time stamp information to load arbiter 216. The time stamp information allows load arbiter 216 to determine and send the oldest instruction to load/store unit 224. Alternatively, load/store arbiter 216 can receive and send instructions on a round robin basis, where the first instruction that reaches arbiter 216 is the first instruction sent to load/store unit 224. The round robin basis is matched by decode/issue units 202, 252 for issuing independent load/store instructions to load queues 208-214.

Figure 3:
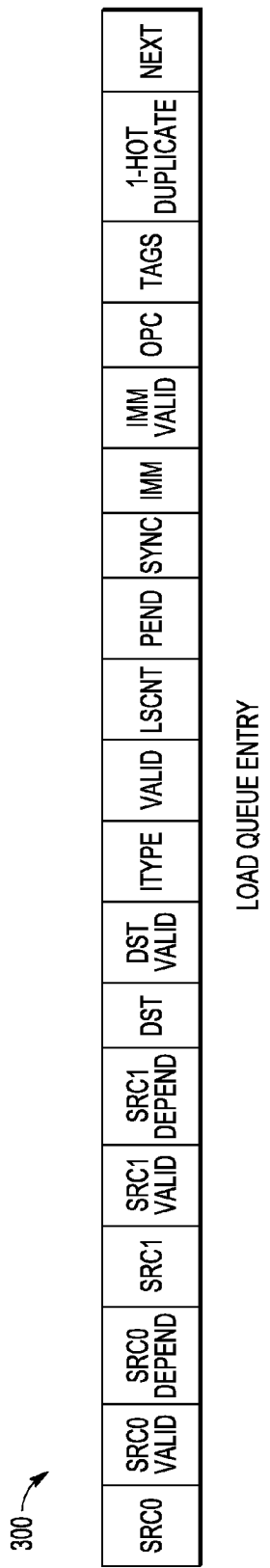
FIG. 3 is a diagram of an embodiment of an execution queue entry in the computer processor of FIG. 2.

FIG. 3 is a diagram of an embodiment of a load/store execution queue entry 300 that can be used in the computer processor of FIG. 2 that includes several fields or tags with the following labels and corresponding significance:

| | |
|---|---|
| SRC0 | first source operand |
| SRC0_VALID | first source operand is valid |
| SRC0_DEPEND | first operand depends on immediately preceding instruction in the same queue |
| SRC1 | second source operand |
| SCR1_VALID | second source operand is valid |
| SRC1_DEPEND | second operand depends on immediately preceding instruction in the same queue |
| DST | destination operand in register file to store result of instruction execution |
| DST-VALID | destination is valid |
| ITYPE | type of instruction |
| VALID | instruction entry is valid |
| LSCNT | time stamp for instruction (can be counter value or clock value) |
| PEND | Instruction is pending execution under one of the following conditions:<br>1. Result Pending: instruction has been sent to load/store execution unit or complex integer execution unit and is waiting for result data that will be ready in the next clock cycle<br>2. Sync Pending (2 bits): instruction is waiting for results from other execution queues. Example, load instruction is waiting for results from simple execution queue and complex execution queue. |
| SYNC | dummy instruction used to clear Sync Pending indicator in another queue. |
| IMM | Immediate Data from instruction |
| IMM_VALID | Immediate Data is valid |
| OPC | Decoded opcode field and/or control bits for execution units |
| TAGS | Tags for keeping track of instruction ordering during execution:<br>CPTAG: checkpoint tag for all instructions. The checkpoint tag is incremented only for branch and load instructions;<br>SYNCTAG: sync tag. For SYNC entry in the execution queue, this tag points to the instruction in another execution queue including the execution queue number and the entry number in the queue. |
| 1-HOT | bit fields used to indicate whether a queue includes |
| DUPLICATE | an instruction that is duplicated in another queue |
| NEXT | indicator that next instruction in the queue is to be invalidated due to duplicate instruction in another queue |

Figure 4:
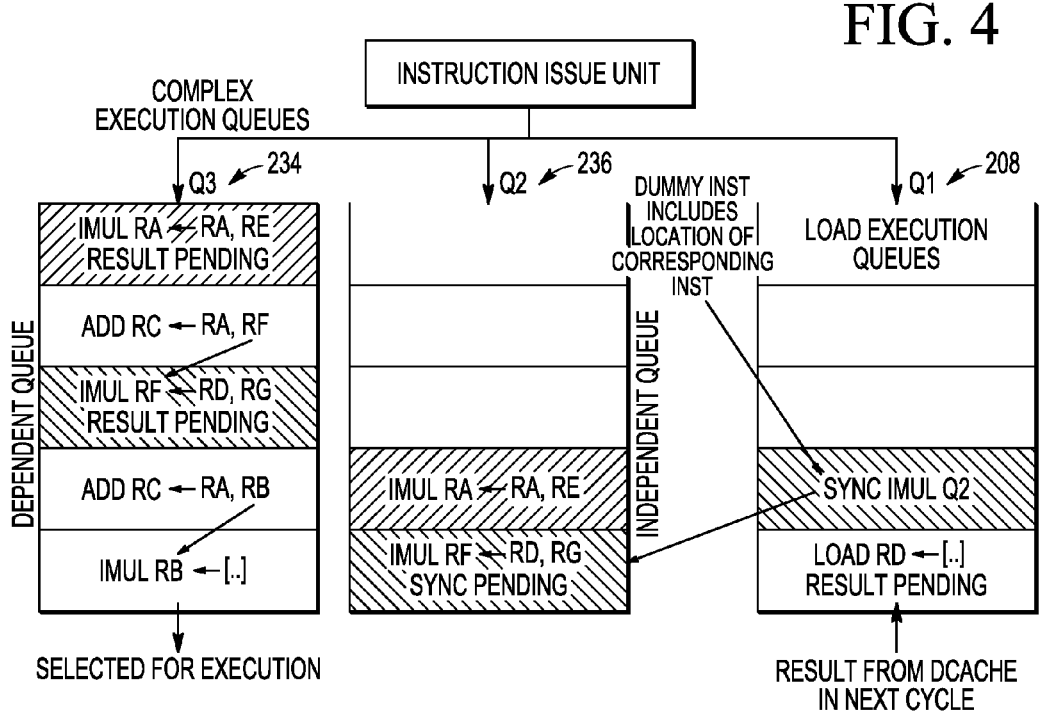
FIG. 4 is an example of instruction handling in execution queues in the computer processor of FIG. 2.
Figure 5:
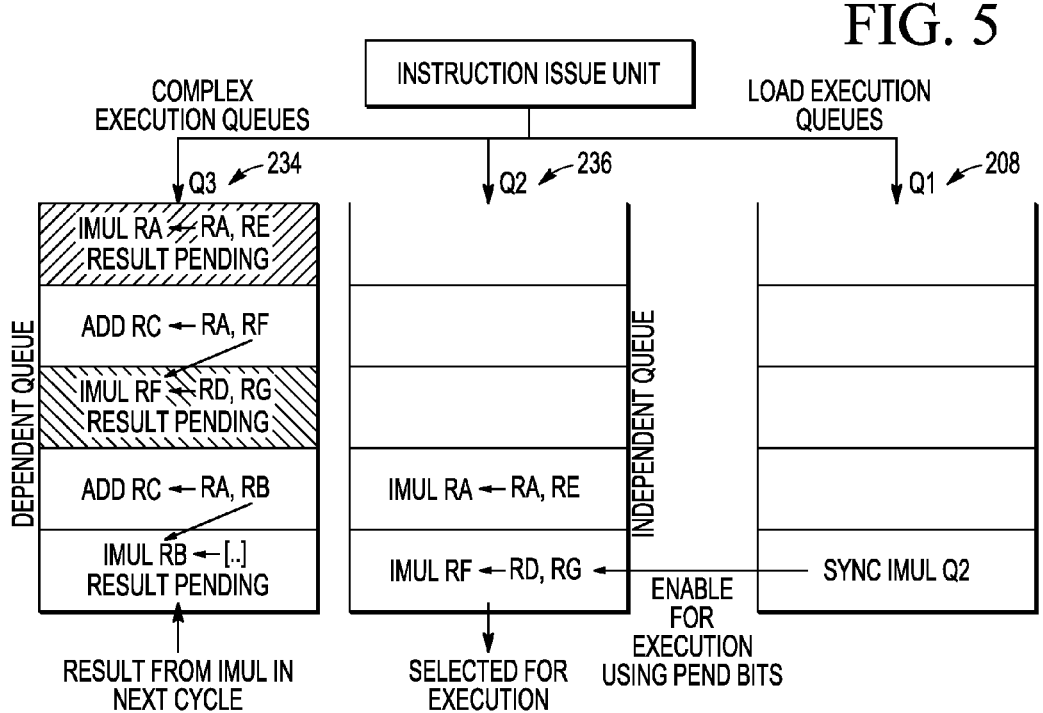
FIG. 5 shows subsequent instruction handling in execution queues of FIG. 4.
Figure 6:
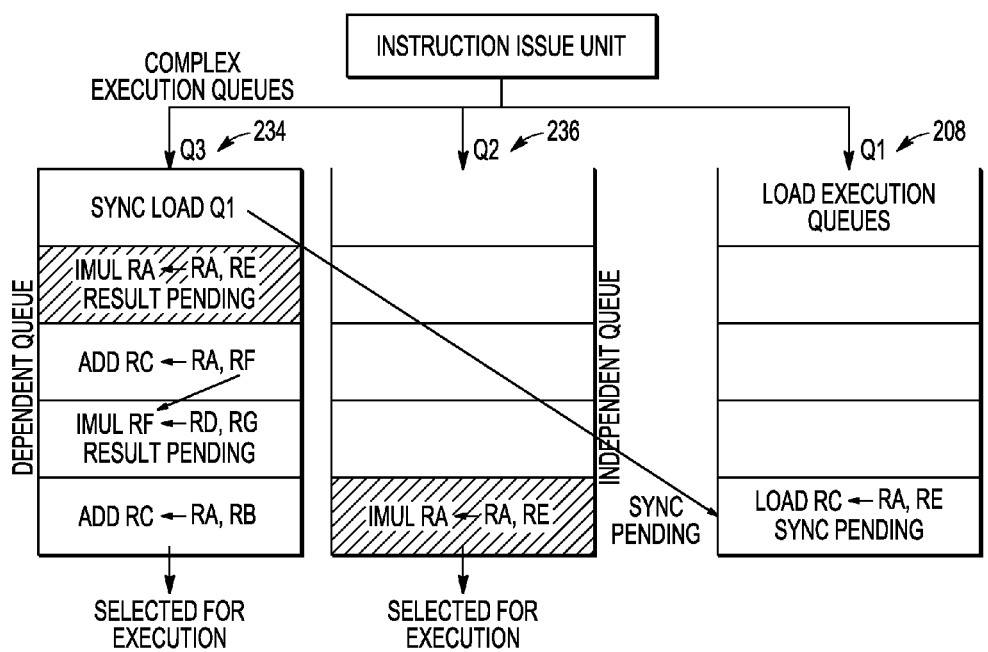
FIG. 6 shows subsequent instruction handling in execution queues of FIG. 5.

FIGS. 4, 5, and 6 show an example of instruction handling in load/store execution queue 208, dependent complex integer execution queue 234, and independent complex integer execution queue 236 using indicators of queue entry 300 in FIG. 3. Referring to FIGS. 2 and 4, FIG. 4 shows a number of complex and non-complex instructions in queues 208, 234, and 236 including a first non-complex instruction (Load RD←[..]) in the bottom entry of load/store execution queue 208. The result for the Load instruction in the bottom entry of load/store execution queue 208 is due from the data cache in the next processor cycle.

Dependent complex integer execution queue 234 includes a first complex instruction (IMUL←RB [..]) in the bottom entry and a non-complex instruction (Add RC←RA, RB) in the second to last entry with an operand that depends on the result of the first complex instruction. The first complex instruction has been selected for execution.

A second complex instruction (IMUL RF←RD, RG) was also received that depends on the result (RD) of the Load instruction. Since the dependent complex integer execution queue 234 was not empty when the second complex instruction was received, the second complex instruction is saved to both the dependent and independent complex instruction execution queues 234, 236. Processor 102 sets a Result Pending indicator for the second complex instruction entry in the dependent complex instruction execution queue 234. Processor 102 also saves or inserts a SYNC instruction or indicator in the load/store queue 208 with SYNCTAG (FIG. 3) that indicates the location (queue) and queue entry number of the second complex instruction in the independent queue 236. Additionally, a SYNC Pending indicator is saved in the entry for the second complex instruction in the independent complex integer execution queue 236.

Dependent complex integer execution queue 234 further received a second non-complex instruction (Add RC←RA, RF) that is placed in the queue after the second complex instruction, since an operand (RF) for the second non-complex instruction depends on the result of the second complex instruction.

A third complex instruction (IMUL RA←RA, RE) was received whose operands do not depend on another instruction. Since the dependent complex integer execution queue 234 is not empty, the third complex instruction is saved in both the dependent and the independent complex instruction execution queues 234, 236. A Result Pending indicator is set for the third complex instruction's entry in the dependent complex instruction execution queue 234.

Subsequent to FIG. 4, FIG. 5 shows an example of the instructions in queues 208, 234, and 236 after the next processor cycle. The previous Load instruction at the bottom of load/store execution queue 208 has been removed and the SYNC instruction with SYNC tag is now at the bottom entry of load/store execution queue 208. The first instruction and the SYNC instruction clear the SYNC Pending indicator in the second complex instruction (IMUL RF←RD, RG) in execution queue 236 so processor 102 enables the corresponding second complex instruction for execution using the Sync Pending indicator in the instruction's queue entry, as specified. Since the second first complex instruction is now at the bottom of independent complex instruction execution queue 236, processor 102 selects the second complex instruction for execution.

The Result Pending indicator is set for the first complex instruction (IMUL←RB [..]) in the bottom entry of the dependent complex integer execution queue 234 as the instruction awaits the result in the next processor cycle. The remaining instructions in queues 236, 234 are the same as in FIG. 4.

Following FIG. 5, FIG. 6 shows an example of the instructions in queues 208, 234, and 236 after the next processor cycle. The first and second complex instructions at the bottom of respective queues 234, 236 have been invalidated and the entries in the queues 234, 236 have shifted down by one entry. The third complex instruction (IMUL RA←RA, RE) at the bottom of queue 236 and non-complex instruction (Add RC←RA, RB) at the bottom of queue 234 have been selected for execution.

A new Load instruction (Load RC←RA, RE) has been entered in the bottom of queue 208 that includes an operand (RA) that depends on the result from third complex instruction (IMUL RA←RA, RE) in queue 234. Since the load/store instruction depends on an instruction in complex integer execution queue 234, a SYNC instruction or indicator is entered in the next available entry in queue 234, and a SYNCTAG is set to point to the load instruction in load execution queue 208 in the corresponding entry for the Sync instruction in the queue 234. The Load instruction along with a SYNC Pending indicator is saved to load/store queue 208.

Figure 7:
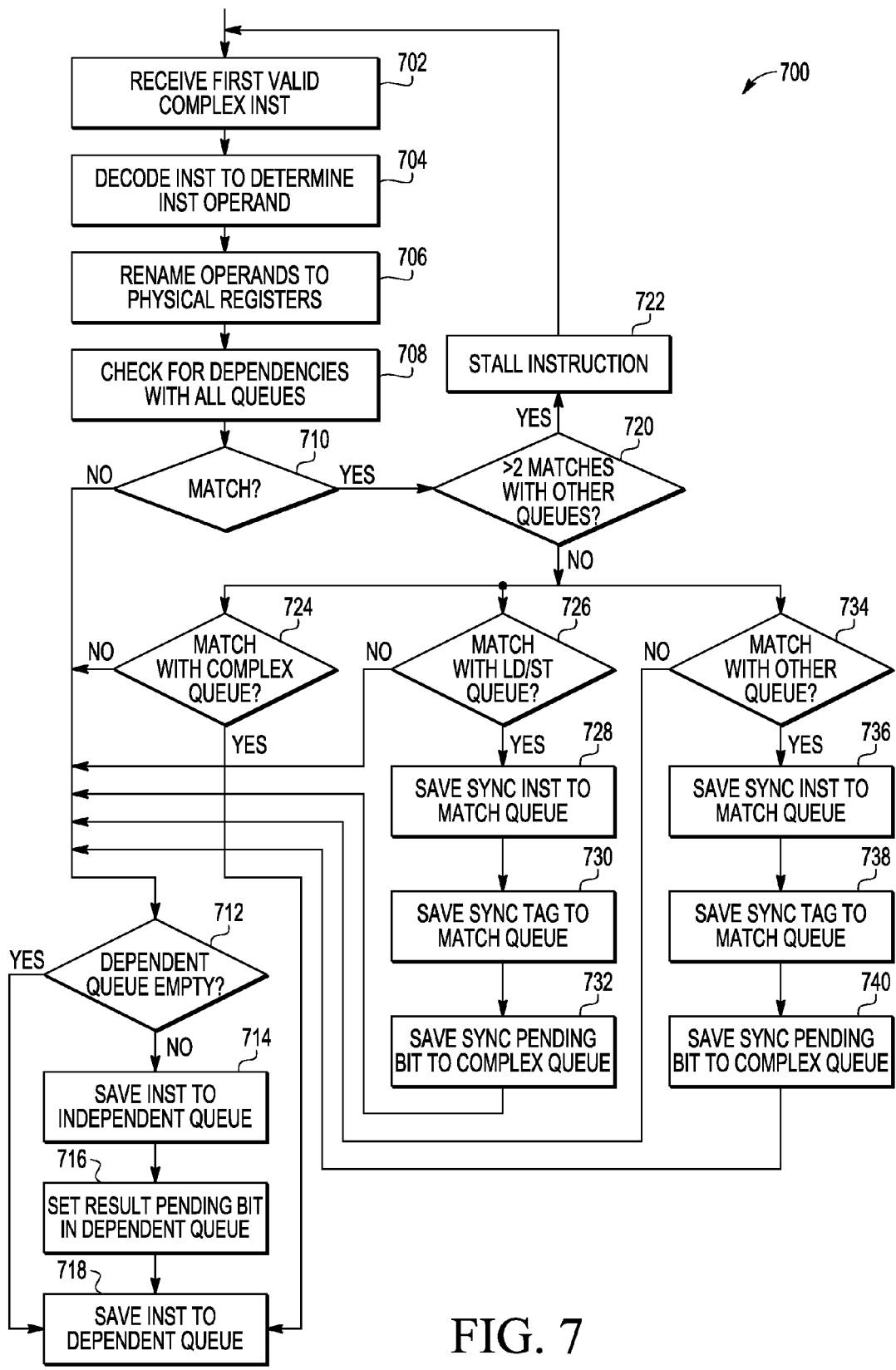
FIG. 7 is a flow diagram of an embodiment of a method for handling a first valid complex instruction in a decode/issue unit in the computer processor of FIG. 2.

FIG. 7 is a flow diagram of an embodiment of a method 700 for handling a first valid complex instruction in a decode/issue unit in the computer processor of FIG. 2, for example, the operation of decode/issue units 202, 252. Process 702 includes a decode/issue unit receiving a valid complex instruction. Process 704 includes decoding the instruction to determine the instruction operands. Process 706 includes renaming operands to physical registers. Process 708 includes checking for instruction dependencies with all execution queues. For example, process 708 can determine whether the operands of the received instruction depend on a second instruction stored in one of the execution queues as well as on a third instruction stored in another one of the execution queues.

Process 710 determines whether the received complex instruction depends on an instruction in another queue. If no dependent instructions are found, process 712 determines whether the dependent complex integer execution queue is empty. If the dependent complex integer execution queue is empty, process 718 saves the instruction to the dependent complex integer execution queue. If the dependent complex integer execution queue is not empty, process 714 includes saving the instruction to the independent complex instruction execution queue. Process 716 sets a result pending indicator in the dependent complex instruction execution queue, and process 718 saves the instruction to the dependent complex integer execution queue.

Returning to process 710, if the received instruction depends on at least one instruction in the other execution queues, process 720 determines whether the received complex instruction depends on more than two instructions in other execution queues. If the valid complex instruction depends on more than two instructions in other execution queues, process 722 stalls the complex instruction and returns to process 702.

If the valid complex instruction does not depend on more than two instructions in the execution queues in process 720, process 724 determines whether the received complex instruction depends on an instruction in one of the complex integer execution queues. If the received instruction depends on an instruction in one of the complex integer execution queues, process 718 saves the instruction to the dependent complex integer execution queue. If the received instruction does not depend on an instruction in one of the complex integer execution queues in process 724, control transitions to process 712.

Returning to process 720, if the valid complex instruction does not depend on more than two instructions in the execution queues in process 720, process 726 determines whether the valid complex instruction received in process 702 depends on (or matches) one of the instructions in a load/store queue. If the valid complex instruction does not depend on one of the instructions in a load/store queue, process 726 transitions to process 712. Otherwise, if the valid complex instruction does depend on an instruction in a load/store queue, process 728 saves or inserts a SYNC instruction in the load/store queue that includes the matching instruction and process 730 sets a SYNCTAG for the SYNC instriction instruction in the load/store queue that includes the matching instruction. The SYNCTAG points to the complex instruction in the complex queue. Process 732 saves a SYNC Pending indicator to the complex queue containing the valid complex instruction. Control then passes to process 712.

Returning again to process 720, if the valid complex instruction does not depend on more than two instructions in the execution queues in process 720, process 734 determines whether the valid complex instruction received in process 702 depends on (or matches) one of the instructions in another queue. If the valid complex instruction does not depend on one of the instructions in another queue, process 734 transitions to process 712. Otherwise, if the valid complex instruction does depend on an instruction in another queue, process 736 saves or inserts a SYNC instruction in the queue that includes the matching instruction and process 738 sets a SYNCTAG for the SYNC instruction in the queue that includes the matching instruction. The SYNCTAG points to the complex instruction in the complex queue. Process 740 saves a SYNC Pending indicator to the complex queue containing the valid complex instruction. Control then passes to process 712.

Figure 8:
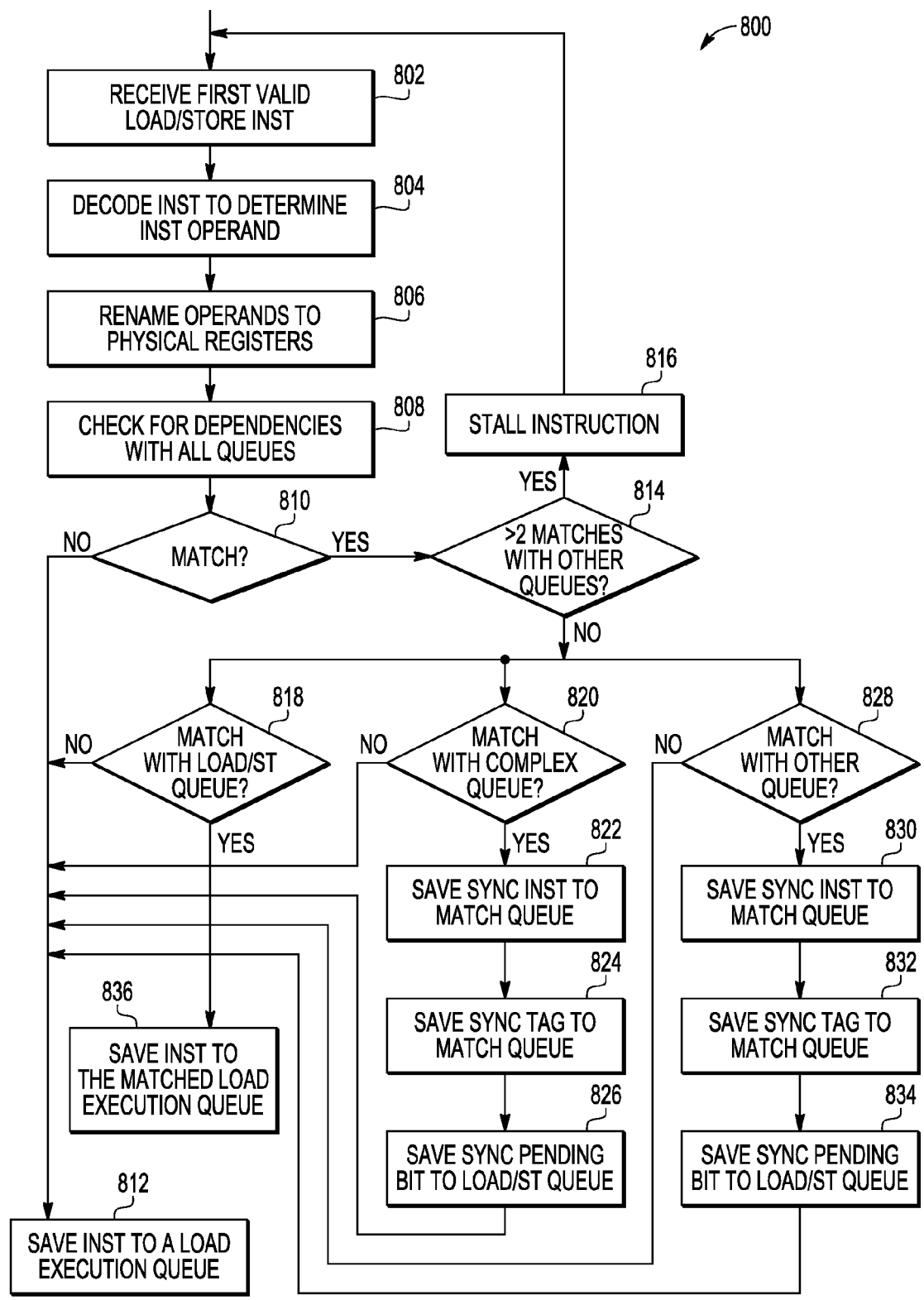
FIG. 8 is a flow diagram of an embodiment of a method for handling a first valid load/store instruction in a decode/issue unit in the computer processor of FIG. 2.

FIG. 8 is a flow diagram of an embodiment of a method 800 for handling a first valid load/store instruction in a decode/issue unit in the computer processor of FIG. 2, for example, the operation of decode/issue units 202, 252. Process 802 includes a decode/issue unit receiving a valid load/store instruction. Process 804 includes decoding the instruction to determine the instruction operands. Process 806 includes renaming operands to physical registers. Process 808 includes checking for instruction dependencies with all execution queues. For example, process 808 can determine whether the operands of the received instruction depend on a second instruction stored in one of the execution queues as well as on a third instruction stored in another one of the execution queues.

Process 810 determines whether the received valid load/store instruction depends on an instruction in another queue. If no dependent instructions are found, process 812 saves the instruction to a load/store execution queue.

Returning to process 810, if there is at least one match between the received load/store instruction and an instruction in one of the other execution queues, process 814 determines whether the received load/store instruction depends on more than two instructions in other execution queues. If the valid load/store instruction depends on more than two instructions in the execution queues, process 816 stalls the load/store instruction and returns to process 802.

If the valid load/store instruction does not depend on more than two instructions in the execution queues in process 814, process 818 determines whether the received load/store instruction depends on an instruction in one of the load/store queues. If the received load/store instruction depends on an instruction in one of the load/store queues, process 836 saves the instruction to the matched load execution queue. If the received load/store instruction does not depend on an instruction in one of the load/store queues in process 818, control transitions to process 812.

Returning to process 814, if the valid load/store instruction does not depend on more than two instructions in the execution queues in process 814, process 820 determines whether the valid load/store instruction received in process 802 depends on (or matches) one of the instructions in a complex integer execution queue. If the valid load/store instruction does not depend on one of the instructions in a complex integer execution queue, process 820 transitions to process 812. Otherwise, if the valid load/store instruction does depend on an instruction in a complex integer execution queue, process 822 saves or inserts a SYNC instruction in the complex integer execution queue that includes the matching instruction and process 824 sets a SYNCTAG in the corresponding entry for the instruction in the complex integer execution queue that includes the matching instruction. The SYNCTAG points to the complex instruction in the complex queue. Process 826 saves a SYNC Pending indicator to the load/store queue containing the valid load/store instruction. Control then passes to process 812.

Returning again to process 814, if the valid load/store instruction received in process 802 does not depend on more than two instructions in the execution queues in process 814, process 828 determines whether the valid load/store instruction depends on (or matches) an instructions in another queue. If the valid load/store instruction does not depend on one of the instructions in another queue, process 828 transitions to process 812. Otherwise, if the valid load/store instruction does depend on an instruction in another queue, process 830 saves or inserts a SYNC instruction in the queue that includes the matching instruction and process 832 sets a SYNCTAG for the SYNC instruction in the queue that includes the matching instruction. The SYNCTAG points to the complex instruction in the complex queue. Process 834 saves a SYNC Pending indicator to the load/store queue containing the valid load/store instruction. Control then passes to process 812.

Figure 9:
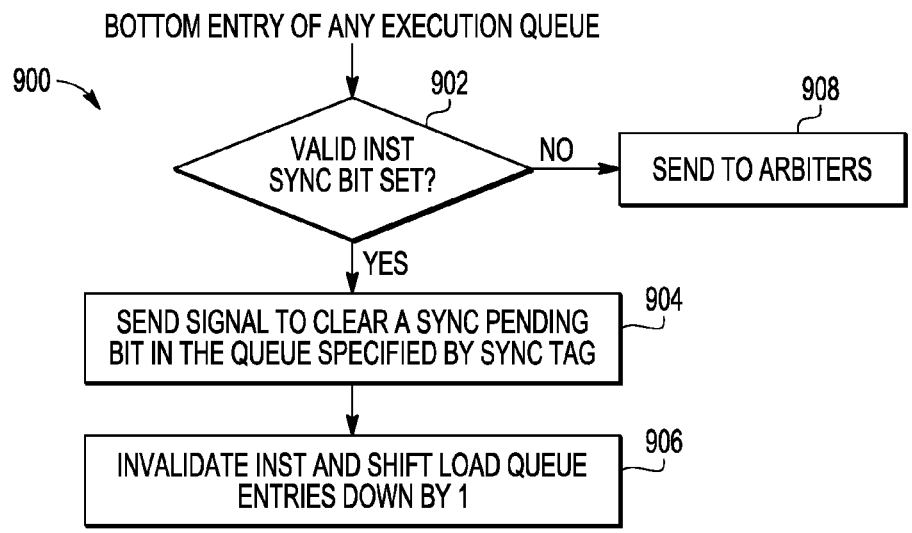
FIG. 9 is a flow diagram of an embodiment of a method for handling bottom entries in execution queues in the computer processor of FIG. 2.

FIG. 9 is a flow diagram of an embodiment of a method 900 for handling bottom entries in execution queues in the computer processor 102 of FIG. 2, for example, using issue/decode units 202, 252. Process 902 includes determining whether a SYNC indicator is set for a valid instruction at the bottom of an execution queue. If the SYNC indicator is not set, process 908 includes sending the valid instruction to an arbiter that corresponds to the execution queue. If the SYNC indicator is set, process 904 includes sending a signal to clear a SYNC Pending indicator in the queue specified by a corresponding SYNCTAG. Process 906 includes invalidating the instruction at the bottom of the queue and shifting the load queue entries down by one space in the queue.

Figure 10:
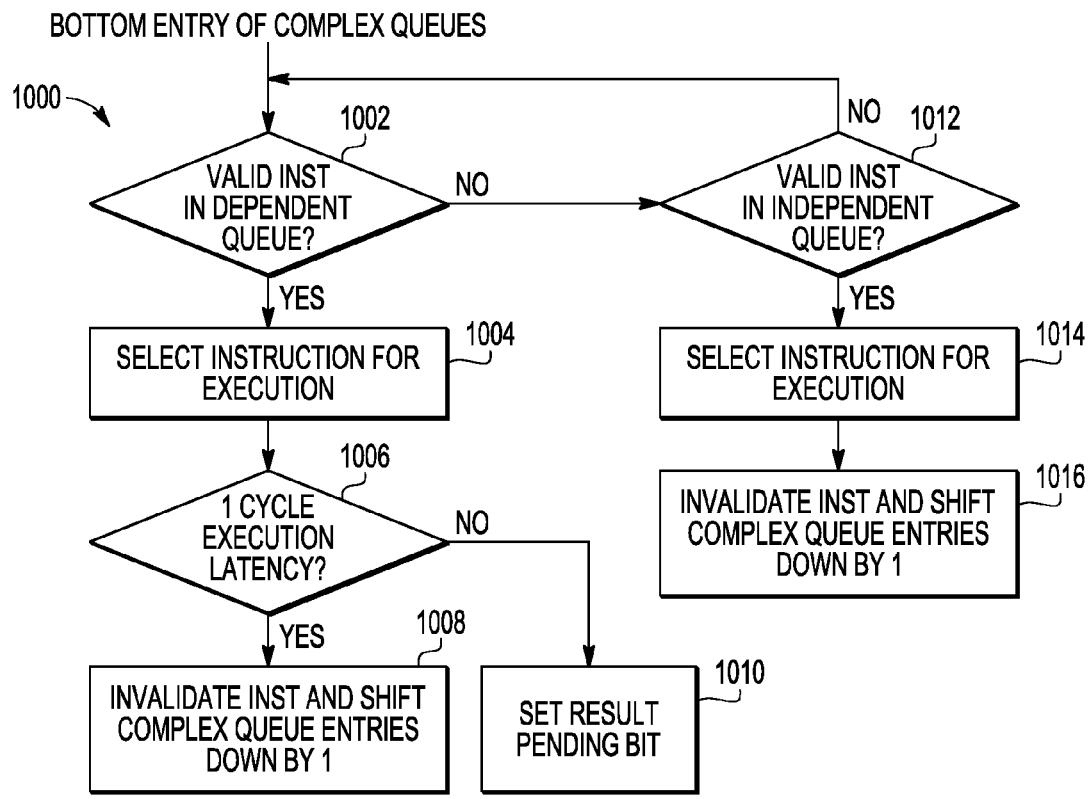
FIG. 10 is a flow diagram of an embodiment of a method for handling bottom entries in complex queues in the computer processor of FIG. 2.

FIG. 10 is a flow diagram of an embodiment of a method 1000 for handling bottom entries in complex integer execution queues 234, 236 in the computer processor 102 of FIG. 2. Process 1002 includes determining whether there is a valid instruction in the dependent complex integer execution queue. If there is a valid instruction in the dependent complex integer execution queue, process 1004 selects the instruction for execution. Process 1006 determines whether the instruction has an execution latency, for example, a latency of one cycle. If the instruction will complete in one cycle, process 1008 invalidates the instruction and shifts the dependent complex integer execution queue entries down by one slot. If the instruction is determined not to have a one-cycle latency in process 1006, process 1010 sets the Result Pending indicator for the instruction.

Returning to process 1002, if there is not a valid instruction in the dependent complex integer execution queue, process 1012 determines whether there is a valid instruction in the independent complex integer execution queue. If there is not a valid instruction in the independent complex integer execution queue, control transfers to process 1002. If there is a valid instruction in the independent complex integer execution queue, process 1014 selects the instruction for execution, and process 1016 invalidates the instruction and shifts the independent complex integer execution queue entries down by one slot.

By now it should be appreciated that systems and methods have been disclosed that can include a processor 102 having an instruction unit 200, 250, a decode/issue unit 202, 252, a first execution queue 208 (Id ex Q) configured to provide instructions of a first instruction type to a first execution unit 224, a second execution queue 234 (complex int.Q) configured to provide instructions of a second instruction type to a second execution unit. In such a system, a method can be performed that includes, for example, receiving a first instruction (IMUL) of the second instruction type 702, 802; decoding the first instruction by the decode/issue unit to determine the operands of the first instruction 704, 804; determining that the operands of the first instruction include a dependency on a second instruction (Id) of the first instruction type stored in a first entry of the first execution queue 710 "yes" and 726 "yes", 810 "yes" and 820 "yes"; and storing the first instruction in a first entry of the second execution queue 718, 714, 812. In response to the determining that the operands of the first instruction include the dependency on the second instruction the method can further includes setting a synchronization indicator corresponding to the first instruction 728/730, 822/824 in a second entry of the first execution queue, immediately adjacent the first entry of the first execution queue, which indicates that the first instruction can be stored in another execution queue; and setting a synchronization pending indicator 732, 826 in the first entry of the second execution queue to indicate that the first instruction has a corresponding synchronization indicator stored in another execution queue.

In another aspect, the synchronization indicator corresponding to the first instruction can identify a location of the first instruction in the second execution queue.

In another aspect, the first execution unit can be further characterized as a load/store execution unit and the second execution unit can be further characterized as a complex integer execution unit.

In another aspect, the processor can further comprise a third execution queue 236 configured to provide instructions of the second instruction type to the second execution unit, wherein the second execution queue can be further characterized as a dependent queue and the third execution queue can be further characterized as an independent queue, and the method can further comprise: determining whether the operands of the first instruction include a dependency on any instruction stored in the second execution queue 724. If the operands do not include a dependency on any instruction stored in the second execution queue and the second queue is not empty 724 "no", 712 "no", the first instruction can be stored in a first entry of the third execution queue 714.

In another aspect, if the operands do not include a dependency on any instruction stored in the second execution queue and the second queue is not empty, a result pending indicator can be set in the first entry of the second execution queue for the first instruction 716.

In another aspect, if the operands do not include a dependency on any instruction stored in the second execution queue and the second queue is empty 724 "no", 712 "yes", the first instruction is not stored in the third execution queue.

In another aspect, when a multi-cycle instruction is selected for execution from a bottom entry of the second execution queue, the multi-cycle instruction can be removed from the second execution queue only after a result is received from the second execution unit; and when a multi-cycle instruction is selected for execution from a bottom entry of the third execution queue, the multi-cycle instruction can be removed from the third execution queue prior to receiving a result from the second execution unit.

In another aspect, the first instruction type and the second instruction type are a same type, and the first execution unit and the second execution unit are a same execution unit.

In another aspect, after the second instruction in the first execution queue reaches a bottom entry of the first execution queue and is selected for execution, both the second instruction and the synchronization indicator are simultaneously removed from the first execution queue when a result is received for the second instruction. A synchronization clear indicator can be provided to clear the synchronization pending indicator in the first entry of the second execution queue to indicate that the first instruction is ready for selection for execution. When the synchronization indicator instruction is removed from the execution queue, the synchronization pending indicator of the corresponding instruction can be cleared from the bottom entry of the second execution queue In another aspect, after the second instruction in the first execution queue reaches a bottom entry of the first execution queue and is selected for execution, the second instruction can be removed from the first execution queue when a result is received for the second instruction. After the second instruction is removed from the first execution queue, the synchronization indicator corresponding to the first instruction reaches the bottom entry of the first execution queue. When the synchronization indicator corresponding to the first instruction is at the bottom entry of the first execution queue, a synchronization clear indicator 904 is provided to clear the synchronization pending indicator in the first entry of the second execution queue to indicate that the first instruction is ready for selection for execution. The synchronization indicator can be removed from the bottom entry of the first execution queue 906.

In other embodiments, a processor 102 can include an instruction unit 200 which provides instructions for execution by the processor; a decode/issue unit 202 which decodes instructions received from the instruction unit and issues the instructions; and a plurality of execution queues 208, 232, 234, 236 coupled to the decode/issue unit. Each issued instruction from the decode/issue unit can be stored into an entry of at least one queue of the plurality of execution queues. The plurality of queues can comprise a first queue 208 and a second queue 236, dependent queue, wherein each entry of the first queue is configured to store a synchronization indicator (SYNC+SYNCTAG) which indicates whether or not a corresponding issued instruction, which requires synchronization with an issued instruction already stored in the first queue, can be stored in the second queue.

In another aspect, when a synchronization indicator of a first entry in the first queue is set to indicate that a corresponding issued instruction, which requires synchronization with an issued instruction already stored in the first queue, is stored in the second queue, an operand of the corresponding issued instruction in the second queue can include a data dependency on the issued instruction already stored in the first queue.

In another aspect, when the synchronization indicator of the first entry in the first queue is set to indicate that the corresponding issued instruction, which requires synchronization with the issued instruction already stored in the first queue, can be stored in the second queue, the first entry in the first queue which stores the synchronization indicator can immediately follow a second entry in the first queue which stores the issued instruction.

In another aspect, when the synchronization indicator is set to indicate that the corresponding issued instruction, which requires synchronization with the issued instruction already stored in the first queue, can be stored in the second queue, a synchronization pending indicator can be asserted for the corresponding issued instruction stored in the second queue. The processor further comprises a plurality of execution units coupled to the plurality of execution queues. When the synchronization indicator reaches a bottom entry of the first queue, the first queue can be configured to provide a synchronization clear indicator to clear the synchronization pending indicator for the corresponding issued instruction stored in the second queue to indicate that the corresponding issued instruction is ready for selection for execution.

In another aspect, when the synchronization indicator is set to indicate that the corresponding issued instruction, which requires synchronization with the issued instruction already stored in the first queue, is stored in the second queue, a synchronization pending indicator is asserted for the corresponding issued instruction stored in the second queue, and wherein the processor further comprises a plurality of execution units coupled to the plurality of execution queues. When the issued instruction stored in the first queue reaches a bottom entry of the first queue and a result is received from one of the plurality of execution units for the issued instruction in the bottom entry of the first queue, the first queue is configured to provide a synchronization clear indicator to clear the synchronization pending indicator for the corresponding issued instruction stored in the second queue to indicate that the corresponding issued instruction is ready for selection for execution.

In another aspect, when the issued instruction in the first queue reaches the bottom entry of the first queue, the first queue can be configured to not remove the issued instruction from the first queue until a result is received from a corresponding execution unit of the plurality of execution units.

In still other embodiments, a processor having an instruction unit, a decode/issue unit, a load/store execution queue configured to provide instructions to a load/store execution unit, a first complex integer execution queue configured to provide instructions to a complex integer execution unit can perform a method comprising receiving a complex integer instruction, wherein the complex integer instruction can be characterized as an integer multiply instruction or an integer divide instruction. The complex integer instruction can be decoded by the decode/issue unit to determine operands of the complex integer instruction 704. The operands of the complex integer instruction can be determined to include a dependency on a load instruction stored in a first entry of the load/store execution queue 710 "yes" and 726 "yes". The complex integer instruction can be stored in a first entry of the first complex integer execution queue 718, 714. In response to the determining that the operands of the complex integer instruction include the dependency on the load instruction: a synchronization indicator corresponding to the complex integer instruction 728/730 in a second entry of the load/store execution queue can be set, immediately adjacent the first entry of the load/store execution queue, which indicates that the complex integer instruction can be stored in the complex integer execution queue and identifies a location of the complex integer instruction in the complex integer execution queue. A synchronization pending indicator 732 can be set in the first entry of the first complex integer execution queue to indicate that the complex integer instruction has a corresponding synchronization indicator stored in the load/store execution queue, wherein the complex integer instruction is not ready for selection for execution until the synchronization pending indicator in the first entry can be cleared in response to the synchronization indicator reaching a bottom entry of the load/store execution queue.

In another aspect, the processor can further comprise a second complex integer execution queue configured to provide instructions to the complex integer execution unit. The first complex integer execution queue can be further characterized as a dependent queue and the second complex integer execution queue can be further characterized as an independent queue. The method can include determining whether the operands of the complex integer instruction include a dependency on any instruction stored in the first complex integer execution queue 724. If the operands do not include a dependency on any instruction stored in the first complex integer execution queue and the first complex integer execution queue is not empty 724 "no", 712 "no", the first instruction can be stored in a first entry of the second complex integer execution queue 714.

In another aspect, if the operands do not include a dependency on any instruction stored in the first complex integer execution queue and the first complex integer execution queue is not empty, a result pending indicator can be set in the first entry of the first complex integer execution queue for the complex integer instruction 716.

In another aspect, if the operands do not include a dependency on any instruction stored in the first complex integer execution queue and the first complex integer execution queue is empty 724 "no", 712 "yes", the complex integer instruction is not stored in the second complex integer execution queue.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Some of the above embodiments, as applicable, may be implemented using a variety of different information processing systems. For example, although FIG. 1 and FIG. 2 and the discussion thereof describe an exemplary information processing architecture, this exemplary architecture is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the disclosure is described herein with reference to specific embodiments, various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to disclosures containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of handling instructions in a processor comprising:
    receiving a first instruction of a second instruction type in the processor;
    decoding the first instruction by a decode/issue unit to determine operands of the first instruction;
    determining that the operands of the first instruction include a dependency on a second instruction of a first instruction type stored in a first entry of a first execution queue, wherein the first execution queue is configured to provide instructions of the first instruction type to a first execution unit;
    storing the first instruction in a first entry of a second execution queue,
        wherein the second execution queue is configured to provide instructions of the second instruction type to a second execution unit;
    determining whether the operands of the first instruction include a dependency on any instruction stored in the second execution queue;
        when the operands do not include a dependency on any instruction stored in the second execution queue and the second queue is not empty, storing the first instruction in a first entry of a third execution queue, wherein the third execution queue configured to provide instructions of the second instruction type to the second execution unit;
    in response to the determining that the operands of the first instruction include the dependency on the second instruction:
        setting a synchronization indicator corresponding to the first instruction in a second entry of the first execution queue, immediately adjacent the first entry of the first execution queue, which indicates that the first instruction is stored in another execution queue; and setting a synchronization pending indicator in the first entry of the third execution queue to indicate that the first instruction has a corresponding synchronization indicator stored in another execution queue,
wherein the first execution unit is further characterized as a load/store execution unit, the second execution unit is further characterized as a complex integer execution unit, the second execution queue is further characterized as a dependent queue and the third execution queue is further characterized as an independent queue.

2. The method of claim 1, wherein the synchronization indicator corresponding to the first instruction identifies a location of the first instruction in the second execution queue.

3. The method of claim 1, further comprising:
when the operands do not include a dependency on any instruction stored in the second execution queue and the second queue is not empty, setting a result pending indicator in the first entry of the second execution queue for the first instruction.

4. The method of claim 1, wherein when the operands do not include a dependency on any instruction stored in the second execution queue and the second queue is empty, the first instruction is not stored in the third execution queue.

5. The method of claim 1, further comprising:
when a multi-cycle instruction is selected for execution from a bottom entry of the second execution queue, removing the multi-cycle instruction from the second execution queue only after a result is received from the second execution unit; and
when a multi-cycle instruction is selected for execution from a bottom entry of the third execution queue, removing the multi-cycle instruction from the third execution queue prior to receiving a result from the second execution unit.

6. The method of claim 1, wherein the first instruction type and the second instruction type are a same type, and the first execution unit and the second execution unit are a same execution unit.

7. The method of claim 6, further comprising:
after the second instruction in the first execution queue reaches a bottom entry of the first execution queue and is selected for execution, simultaneously removing both the second instruction and the synchronization indicator from the first execution queue when a result is received for the second instruction; and
providing a synchronization clear indicator to clear the synchronization pending indicator in the first entry of the second execution queue to indicate that the first instruction is ready for selection for execution.

8. The method of claim 1, further comprising:
after the second instruction in the first execution queue reaches a bottom entry of the first execution queue and is selected for execution, removing the second instruction from the first execution queue when a result is received for the second instruction wherein, after the second instruction is removed from the first execution queue, the synchronization indicator corresponding to the first instruction reaches the bottom entry of the first execution queue;
when the synchronization indicator corresponding to the first instruction is at the bottom entry of the first execution queue, providing a synchronization clear indicator to clear the synchronization pending indicator in the first entry of the second execution queue to indicate that the first instruction is ready for selection for execution; and
removing the synchronization indicator from the bottom entry of the first execution queue.

9. A processor, comprising:
an instruction unit which provides instructions for execution by the processor;
a decode/issue unit which decodes instructions received from the instruction unit and issues the instructions; and
a plurality of execution queues coupled to the decode/issue unit, wherein each issued instruction from the decode/issue unit is stored into an entry of at least one queue of the plurality of execution queues, wherein the plurality of queues comprises:
a first queue and a second queue, wherein each entry of the first queue is configured to store a synchronization indicator which indicates whether or not a corresponding issued instruction, which requires synchronization with an issued instruction already stored in the first queue, is stored in the second queue, and
a third queue configured to provide instructions of a second instruction type to the second unit, wherein the second queue is further characterized as a dependent queue and the third queue is further characterized as an independent queue,
wherein when operands of a first instruction include a dependency on any instruction stored in the second queue, and
when the operands do not include a dependency on any instruction stored in the second queue and the second queue is not empty, storing the first instruction in a first entry of the third queue.

10. The processor of claim 8, wherein when a synchronization indicator of a first entry in the first queue is set to indicate that a corresponding issued instruction, which requires synchronization with an issued instruction already stored in the first queue, is stored in the second queue, an operand of the corresponding issued instruction in the second queue includes a data dependency on the issued instruction already stored in the first queue.

11. The processor of claim 10, wherein when the synchronization indicator of the first entry in the first queue is set to indicate that the corresponding issued instruction, which requires synchronization with the issued instruction already stored in the first queue, is stored in the second queue, the first entry in the first queue which stores the synchronization indicator immediately follows a second entry in the first queue which stores the issued instruction.

12. The processor of claim 11, wherein when the synchronization indicator is set to indicate that the corresponding issued instruction, which requires synchronization with the issued instruction already stored in the first queue, is stored in the second queue, a synchronization pending indicator is asserted for the corresponding issued instruction stored in the second queue, and wherein the processor further comprises:
a plurality of execution units coupled to the plurality of execution queues, wherein when the synchronization indicator reaches a bottom entry of the first queue, the first queue is configured to provide a synchronization clear indicator to clear the synchronization pending indicator for the corresponding issued instruction stored in the second queue to indicate that the corresponding issued instruction is ready for selection for execution.

13. The processor of claim 11, wherein when the synchronization indicator is set to indicate that the corresponding issued instruction, which requires synchronization with the issued instruction already stored in the first queue, is stored in the second queue, a synchronization pending indicator is asserted for the corresponding issued instruction stored in the second queue, and wherein the processor further comprises:

a plurality of execution units coupled to the plurality of execution queues, wherein:
when the issued instruction stored in the first queue reaches a bottom entry of the first queue and a result is received from one of the plurality of execution units for the issued instruction in the bottom entry of the first queue, the first queue is configured to provide a synchronization clear indicator to clear the synchronization pending indicator for the corresponding issued instruction stored in the second queue to indicate that the corresponding issued instruction is ready for selection for execution.

14. The processor of claim 13, wherein when the issued instruction in the first queue reaches the bottom entry of the first queue, the first queue is configured to not remove the issued instruction from the first queue until a result is received from a corresponding execution unit of the plurality of execution units.

15. A method of handling instructions in a processor comprising:
receiving a complex integer instruction in the processor, wherein the complex integer instruction is characterized as an integer multiply instruction or an integer divide instruction;
decoding the complex integer instruction by a decode/issue unit to determine operands of the complex integer instruction;
determining that the operands of the complex integer instruction include a dependency on a load instruction stored in a first entry of a load/store execution queue, wherein the load/store execution queue is configured to provide instructions to a load/store execution unit;
storing the complex integer instruction in a first entry of a first complex integer execution queue, wherein the first complex integer execution queue is configured to provide instructions to a complex integer execution unit;
determining whether the operands of the complex integer instruction include a dependency on any instruction stored in the first complex integer execution queue;
when the operands do not include a dependency on any instruction stored in the first complex integer execution queue and the first complex integer queue is not empty, storing the complex integer instruction in a first entry of a second complex integer execution queue, wherein the second complex integer execution queue is configured to provide instructions to the complex integer execution unit;
in response to the determining that the operands of the complex integer instruction include the dependency on the load instruction:
setting a synchronization indicator corresponding to the complex integer instruction in a second entry of the load/store execution queue, immediately adjacent the first entry of the load/store execution queue, which indicates that the complex integer instruction is stored in the complex integer execution queue and identifies a location of the complex integer instruction in the complex integer execution queue; and
setting a synchronization pending indicator in the first entry of the second complex integer execution queue to indicate that the complex integer instruction has a corresponding synchronization indicator stored in the load/store execution queue, wherein the complex integer instruction is not ready for selection for execution until the synchronization pending indicator in the first entry is cleared in response to the synchronization indicator reaching a bottom entry of the load/store execution queue,
wherein the first complex integer execution queue is further characterized as a dependent queue and the second complex integer execution queue is further characterized as an independent queue.

16. The method of claim 15, further comprising:
when the operands do not include a dependency on any instruction stored in the first complex integer execution queue and the first complex integer execution queue is not empty, setting a result pending indicator in the first entry of the first complex integer execution queue for the complex integer instruction.

17. The method of claim 15, wherein when the operands do not include a dependency on any instruction stored in the first complex integer execution queue and the first complex integer execution queue is empty, the complex integer instruction is not stored in the second complex integer execution queue.

* * * * *